United States Patent Office 3,034,374
Patented May 15, 1962

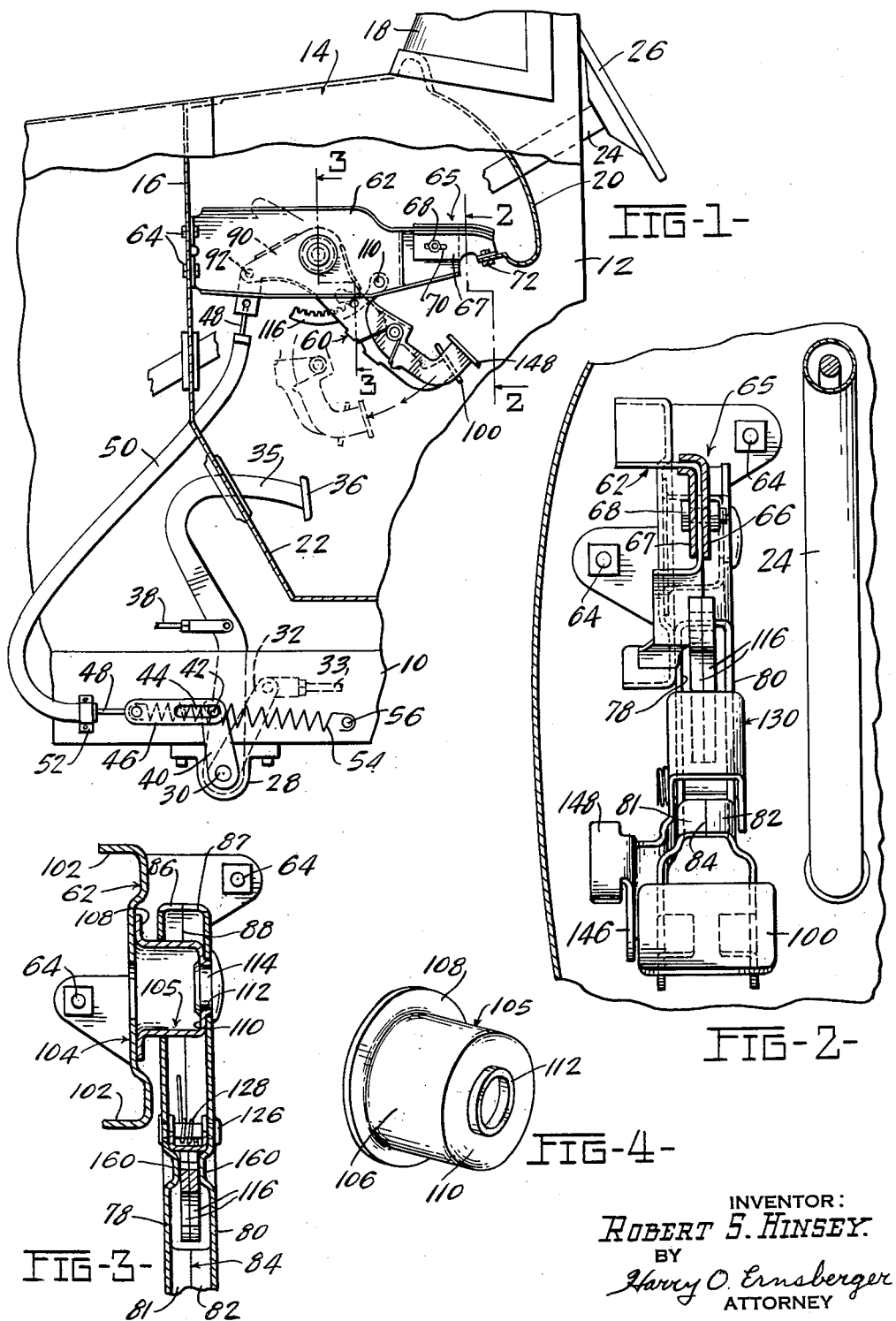

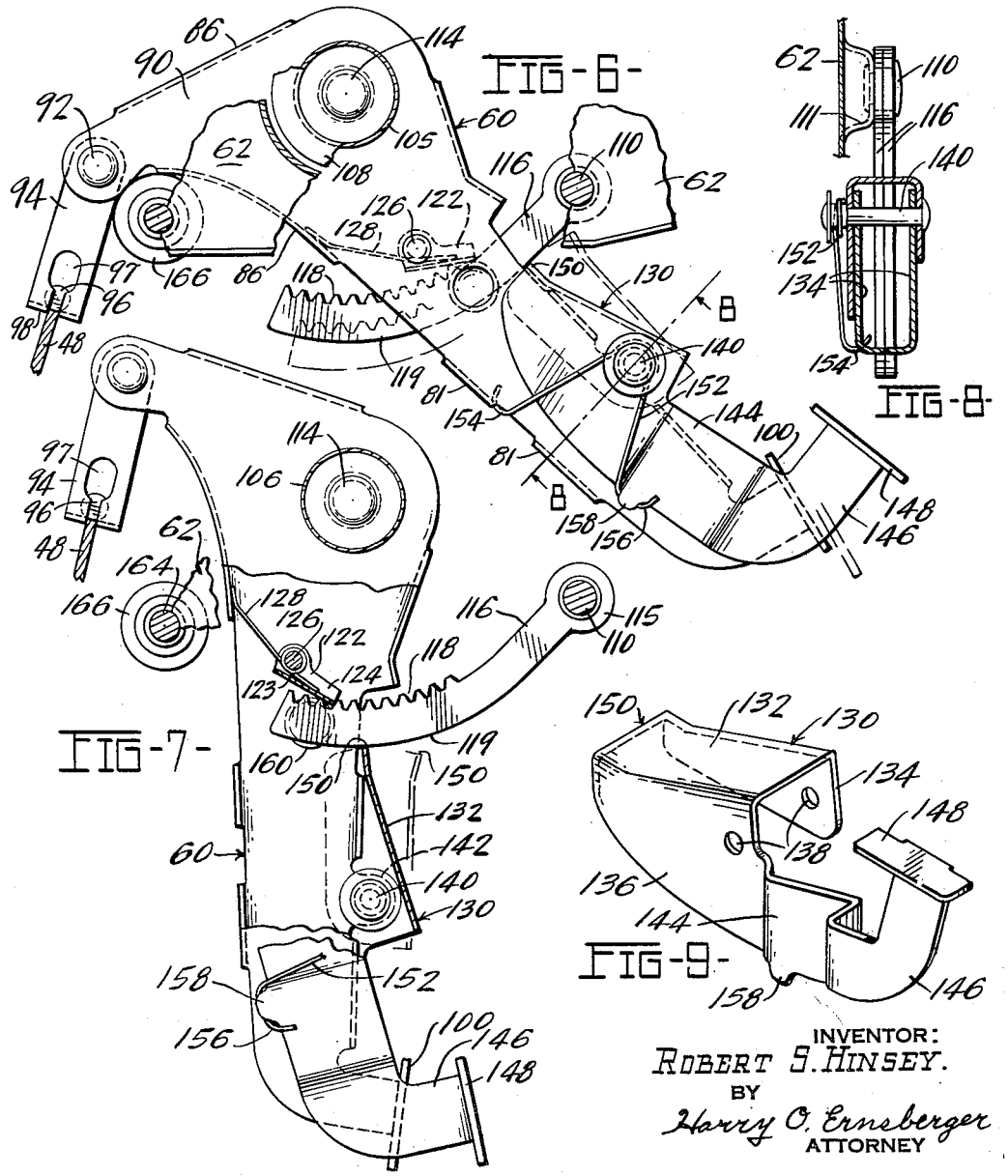

3,034,374
MECHANISM CONTROL
Robert S. Hinsey, Toledo, Ohio, assignor to The Bingham-Herbrand Corporation, Toledo, Ohio, a corporation of Ohio
Filed Mar. 23, 1959, Ser. No. 801,220
6 Claims. (Cl. 74—534)

This invention relates to mechanism control and more especially to a foot-operated means or apparatus for actuating or controlling the parking or emergency brakes of an automotive vehicle.

The mechanism control of the invention is inclusive of a foot-operated main lever or lever construction arranged to be connected with a vehicle parking brake mechanism, the construction embodying a lever retaining means effective to hold the main lever or lever construction in brake-setting positions in combination with means associated with the main lever adapted to be foot-operated for releasing the lever retaining means.

An object of the invention is the provision of a foot-operated main lever arrangement embodying a lever retaining means for holding the main lever in brake-setting or adjusted positions in combination with a supplemental lever or articulately supported member carried by the main lever and adapted for foot operation to effect a release of the lever retaining means.

Another object of the invention is the provision of a foot-operated main lever for actuating or controlling mechanism embodying a foot pad portion at one end and a lever retaining ratchet and pawl means disposed intermediate the fulcrum of the lever and the foot pad portion whereby a more compact mechanism control is attained.

Another object of the invention is the provision of a foot-operated main lever arrangement for actuating and controlling the parking or emergency brakes of a vehicle and embodying a pawl and ratchet means for securing the main lever in brake-setting positions and including a supplemental foot-operated lever supported upon the main lever and movable to a position to effect release of the pawl and ratchet mechanism to facilitate return of the main lever to brake release position.

Another object of the invention resides in a mechanism control wherein a foot-operated main lever associated with a pawl and ratchet retaining device of a character wherein the pawl means is pivotally supported by the lever intermediate the lever fulcrum and a foot receiving pad portion of the lever, the pawl cooperating with a relatively movable ratchet member which is adapted to be controlled by a supplemental lever or arm pivotally associated with the main lever, the supplemental lever being normally resiliently biased to a position to maintain engagement of the ratchet with the pawl means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle, certain portions being broken away and illustrating a form of mechanism control of the invention;

FIGURE 2 is a vertical sectional view taken substantially on the line 2—2 of FIGURE 1;

FIGURE 3 is a sectional view taken substantially on the line 3—3 of FIGURE 1;

FIGURE 4 is an isometric view of a bearing means upon which the foot-operated main lever is fulcrumed or articulately supported;

FIGURE 5 is a top plan view of the lever construction, certain parts being broken away and others shown in section for purposes of illustration;

FIGURE 6 is a side elevational view of the lever construction of the invention showing the relative position of the lever retaining means when the main lever is in brake release position;

FIGURE 7 is a view illustrating the relative positions of the components of the lever construction with the foot-operated main lever in brake setting position;

FIGURE 8 is a detail sectional view taken substantially on the line 8—8 of FIGURE 6, and FIGURE 9 is an isometric view of foot-operated control means for the lever retaining means.

While the arrangement of the invention illustrated herein is particularly adapted for installation in a vehicle and usable for actuating or controlling the emergency or parking brakes of the vehicle, it is to be understood that the arrangement may be utilized for actuating or controlling other mechanisms wherever the same may be found to have utility.

Referring to the drawings in detail and first with particular reference to FIGURE 1, there is illustrated an installation of the foot-operated mechanism control of the invention in the operator's compartment which is adapted for controlling or actuating the parking or emergency brakes of the vehicle. The portion of the vehicle illustrated includes longitudinally extending chassis frame members, one of which is shown at 10 supporting a body 12 provided with a cowl 14 to which is secured a dashboard or firewall 16, a windshield 18 and an instrument panel 20. The vehicle includes a toe board 22 connected with the firewall 16, a steering post 24 equipped with a steering wheel 26.

The longitudinally extending frame members 10 are spaced transversely and are connected by transverse frame members (not shown). Secured to each of the frame members 10 is a depending bracket 28, one of which is shown in FIGURE 1, the brackets adapted to journally support a transversely extending shaft 30. Fixed upon the shaft 30 is an arm 32 shown in broken lines in FIGURE 1, which is connected by a brake rod 33 or other suitable means with the parking brake means of the vehicle (not shown) associated with the vehicle drive shaft or the road wheels of the vehicle.

Also mounted upon the shaft 30 is a service brake pedal 35 provided with a foot pad 36, a rod 38 connected with the service brake pedal 35 is adapted to actuate conventional hydraulic service brake mechanism (not shown) of the vehicle. Mounted upon the shaft 30 is a second arm 40 provided at its distal end with a pin 42 arranged for traverse in a slot 44 formed in a link 46. One end of the link 46 is connected with a flexible cable 48 which is disposed for slidable movement in a tubular member or sheath 50, the end of the sheath adjacent the link 46 being secured to the frame member 10 by means of a clip 52, the sheath 50 extending upwardly and through an opening in the toe board 22.

One end of a contractile spring 54 is connected with the link 46 and the other other engaged with a pin or anchor member 56 carried by the frame member 10. The spring 54, in conjunction with the conventional brake return springs (not shown) function to normally bias the link 46 and the cable 48 toward brake released position, viz. in a right-hand direction as viewed in FIGURE 1. The upper region of the sheath 50 may be secured to the firewall 16 by suitable means (not shown). The arrangement of the invention includes a foot-operated main lever or lever construction 60 which is articulately supported by or fulcrumed for pivotal movement upon a support or bracket 62 in a manner hereinafter explained. The forward end of the bracket or lever support 62 is secured to the firewall 16 by means of bolts 64. The rear end region of the bracket 62 is provided with adjustable bracket means 65 including a pair of members 66 and 67 secured to the bracket 62 by means of a bolt 68 which extends through an elongated slot 70 in the members 66 and 67.

The members 66 and 67 are respectively disposed at each side of the bracket 62 and are secured to a flange portion of the instrument panel 20 by means of bolts 72, one of which is shown in FIGURE 1. The slot 70 facilitates assembly of the support bracket 62 and the members 66 and 67 to assure proper installation and rigid support for the bracket 62 between the firewall 16 and the flange of the instrument panel 20.

In the illustrated embodiment of the invention the main lever or lever construction 60 is formed of mating sections 78 and 80 formed of sheet metal each of the mating sections being fashioned with inwardly extending flange portions 81 and 82, shown in FIGURES 2 and 3, which are welded together at a median line 84. The upper portions of the lever sections are likewise formed with pairs of inwardly extending flanges 86 and 87 which are welded together along median lines 88 as shown in FIGURE 3. Through such arrangement a comparatively lightweight yet strong and rigid lever construction 60 is provided.

The main lever 60 is disposed at one side of the support or bracket 62 and is fulcrumed at a region intermediate the ends of the lever 60. The lever 60 is formed with a forwardly extending load arm portion 90, the forward extremities of the lever sections of the portion 90 being provided with aligned openings to accommodate a pin 92 to which is connected a clevis 94. The upper end region of the flexible cable 48 is provided with an anchor member or ball shaped element 96 which is received in a slot 97 in the clevis member and engages the bight portion 98 thereof to establish an operative connection between the load arm portion 90 of the lever 60 and the flexible cable.

Thus pivotal movement of the lever 60, in a clockwise direction as viewed in FIGURE 1, exerts an upward pull on the flexible cable 48 to effect the setting of the emergency brake mechanism. The opposite end of the main lever 60 is provided with a foot pad portion 100. As particularly shown in FIGURE 3, the upper and lower regions of the supporting bracket 62 are formed with laterally extending flanges 102 to provide a rigid and stable support for the lever construction.

As shown particularly in FIGURE 3, a central region 104 of the supporting bracket 62 is embossed or raised from the planar area of the bracket and forms a mounting or support for a bearing means 105 upon which the foot-operated lever 60 is fulcrumed. In the embodiment illustrated, the bearing means comprises a cup-shaped member preferably formed of sheet metal having a cylindrical portion 106, one end being fashioned with an outwardly extending circular flange 108 which is welded throughout its peripheral region to the embossed portion 104 of the support 62.

The opposite end region of the cup-shaped member 90 is provided with an inwardly extending portion 110 which terminates in an axially extending annular flange 112. The section or component 80 of the lever 60 is formed with an opening to fit the exterior circular surface of the annular projection 112 as shown in FIGURE 3. A rivet 114 has head portions which engage respectively the inwardly extending flange 110 of the member 106 and the exterior surface region of the lever section 80 to secure the lever 60 in pivotal relation with the bearing means 106 as shown in FIGURE 3.

The section 78 of the lever 60 is provided with an opening to accommodate the cylindrical portion 106 as shown in FIGURE 3, the axis of the cylindrical portion 106 and the annular flange 112 being the fulcrum axis of the lever 60. The openings in the lever sections 78 and 80 accommodating the bearing means provided by the cylindrical portion 106 and the annular flange 112 are such as to snugly fit the walls of the openings in the lever sections but permit pivotal movement of the lever 60.

Through this arrangement a mounting means is provided for the lever 60 at one side of the support or bracket 62 which makes possible the construction of a support of reduced weight and provide spaced bearing regions for the sheet metal lever 60 to adequately support the same. The depending portion of the main lever 60 provided with the foot pad 100 is disposed substantially at a right angle to the load arm portion 90 of the lever providing a bellcrank shape, a configuration which provides a compact unit requiring a minimum of vertical space.

The lever construction of the invention includes a clutch, lever retaining or locking means comprising cooperating members or elements connected respectively with the support 62 and the lever 60 and adapted for retaining the lever 60 in brakesetting positions. As particularly shown in FIGURES 5, 6 and 8, a stub shaft or rivet 110 extends through openings formed in a boss portion 111 of the support 62 and in the end regions of bars 116, the rivet swaged as shown in FIGURE 5 and forming a pivotal support for the bars 116.

In the arrangement illustrated, one of the component means of the lever retaining construction comprises the two identically shaped bars or ratchet members 116, each having an enlarged portion 115 at the end thereof bored to accommodate the rivet 110. In the embodiment illustrated the ratchet bars 116 are each provided with a series of matching ratchet teeth 118 on an upper surface thereof, the lower surfaces 119 being curved and developed as a radius about the axis of the main lever supporting rivet 114.

The ratchet bars 116 are matched sections preferably formed of sheet metal and in two components in order to reduce the cost of forming the bars as they may be conveniently stamped from sheet metal. The teeth 118 of the respective ratchet bars 116 are matched or aligned in a transverse direction. A pawl member 122 is pivotally carried by the lever 60 and is adapted for cooperation with the teeth 118 of the ratchet bars 116 for retaining the lever in brake-setting or adjusted positions.

The pawl component or clutch member 122 of the lever retaining means is preferably of channel-shaped cross-section, being formed with a bight or web portion 123 and parallel side walls 124. The side walls of the pawl are formed with aligned openings to accommodate a rivet or stub shaft 126 extending through openings formed in the lever sections 78 and 80 whereby the pawl 122 is pivotally supported or mounted upon the lever 60. The distal end region of the web portion 123 of the pawl is adapted for cooperative engagement with the ratchet teeth 118 of the ratchet bars 116 for holding the lever 60 in brake-setting positions.

The pawl 122 is biased toward engaging relation with the ratchet teeth 118 under the influence of a spring 128, one end region of which engages the pawl, the opposite end of the spring engaging the flange 86 of the lever section 78 as shown in FIGURES 3 and 7. The ratchet bars 116, pivotally supported or mounted on the rivet 110, are adapted to be moved in a direction away from the pawl 122 in order to release the lever 60 from brake-setting position for movement to brake release position.

In the embodiment illustrated, means is mounted upon the main lever 60 which is normally disposed to hold or maintain the ratchet bars 116 in a position whereby the teeth 118 are in the path of the pawl 122, the means being movable to a position to permit movement of the bars 116 to a position effecting disengagement of the teeth 118 of the ratchet bars 116 from the pawl 122. The means for accomplishing this purpose includes a supplemental lever or member 130 preferably formed of sheet metal having a web or bight portion 132 and side wall portions 134.

The member 130 is illustrated in FIGURE 9 and is of U-shaped cross-section comprising the web 132 and spaced parallel side wall portions 134 and 136. The side wall portions are provided with openings 138 to accommodate a transversely extending stub shaft or rivet 140. The lever sections 78 and 80 are provided with extensions or projections 142 which are formed with openings aligned with the openings 138 to accommodate the rivet 140, the rivet 140 providing a pivotal axis or fulcrum for the supplemental lever or control member 130.

The side wall portion 136 is provided with an offset extension 144 and a second offset extension 146, the latter being formed with a pad portion 148 disposed adjacent and at one side of the foot pad portion 100 and is adapted to receive the foot of the operator.

The extremity or edge region 150 of the web 132 is normally disposed in the position shown in full lines in FIGURES 6 and 7 with the edge region in contact with the curved lower surface 119 of the ratchet bars 116.

As will be seen from FIGURE 7, the supplemental lever 130 in the position illustrated in full lines, serves to hold or maintain the ratchet bars 116 in an uppermost position wherein the teeth 118 are in a position to be engaged by the pawl 122 to hold the lever 60 in brake-setting positions. Resilient means such as a spring 152, particularly shown in FIGURES 6 and 8, has a coiled portion surrounding the rivet or stub shaft 140, one end 154 of the spring having a hook portion which is engaged with a side wall of the section 78 of the lever, the other end of the spring being provided with the hook portion 156 which is adapted for engagement with a projection 158 formed on the offset portion 144 of the supplemental lever 130.

The spring 152 is tensioned to normally bias the supplemental lever 130 to the position illustrated in full lines in FIGURES 6 and 7 with the edge region 150 of the web 132 in engagement or contact with the surfaces 119 of the ratchet bars 116 so that the ratchet bars are normally held in a position with the ratchet teeth 118 in the path of movement of the pawl 122.

The pivotal axis of the shaft 140 is preferably disposed in a plane normally passing through the axis 114 of the lever support 106 and the edge region 150 of the web 132 so that the supplemental lever 130, in ratchet bar supporting position, is not subjected to forces tending to swing the supplemental lever away from its normal position, the spring 152 serving to resiliently bias the supplemental lever to remain in its normal position.

The supplemental lever 130 is movable to the broken line position illustrated in FIGURES 6 and 7 wherein the edge region 150 of the web 132 moves away from and out of contact with the ratchet bars 116 whereby the ratchet bars may move or swing downwardly by gravity so that the ratchet teeth 118 are out of the path of movement of the pawl 122.

The side walls 78 and 80 of the lever 60 are formed with inwardly extending embossments or projections 160, shown in FIGURES 3 and 7, which serve as guide means for the ratchet bars 116. The embossments 160 are disposed beneath the pawl 122 so that when the ratchet bars 116 are moved downwardly to release the ratchet teeth 118 from the pawl 122, the pawl 122 swings downwardly but its movement is interrupted by the embossments 160 so that the ratchet bars 116, in their lowermost position, are out of the path of the pawl whereby the lever 60 is thereby released for movement to brake released position shown in FIGURE 6.

It should be noted that the foot pad 148 on the supplemental lever or ratchet bar control member 130 is positioned adjacent and preferably slightly rearwardly of the pad 100 on the main lever 60 so that the supplemental lever may be readily depressed by the operator when it is desired to release the lever 60 for movement to brake releasing position.

Means is provided carried by the support 62 for cushioning the impact of the main lever when it reaches brake release position. As particularly shown in FIGURES 5, 6 and 7, a rivet 164 extends through an opening formed in the bracket or support 62 and supports an annular member 166 formed of semi-hard rubber or other yieldable material. The cushioning member 166 is engaged by flange portions on the lever sections to absorb the impact of the lever in brake release position and determines the maximum extent of movement of the lever toward brake release position.

The operation of the lever construction of the invention is as follows: The foot-operated main lever 60 is shown in brake release position in FIGURES 1 and 6. In this position, the supplemental lever 130 is biased in a direction to engage the end region 150 of the web 132 with the lower curved surfaces of the ratchet bars 116. The opposite end region of the main lever 60 is in engagement with the cushioning means 166 and the cable 48, the link 46 and the associated components shown in FIGURE 1 are in brake release position.

When the operator desires to set the parking or emergency brakes by actuation of the main lever 60, foot pressure is applied to the foot pad 100 to swing the main lever in a clockwise direction as viewed in FIGURES 1, 6 and 7 about the fulcrum provided by the member 105 to a brake setting position shown in FIGURE 7. This movement of the lever 60 causes upward movement of the flexible cable 48 to effect a setting of the brake mechanism through the medium of the link 46, arm 32 and the brake rod 33.

During this movement of the lever 60 toward brake-setting position, the arcuately shaped or curved ratchet bars 116 are held in their uppermost position by contact with the edge region 150 of the supplemental lever 130 whereby the pawl rides over the ratchet teeth 118 and when the lever reaches a brake-setting position, the pawl engages a tooth to prevent return movement of the lever 60 hence retaining the brakes in a "set" position. The spring 152 serves to normally bias the supplemental lever 130 to the ratchet bar supporting position.

When it is desired to release the parking brake mechanism, the operator applies foot pressure to the pad 148 of the supplemental lever 130 to cause pivotal movement of the supplemental lever 130 relative to the main lever 60 about the axis of the rivet 140 as a fulcrum, the supplemental lever being moved to the broken line position indicated in FIGURE 7.

The edge region 150 of the web 132 is thus moved away from the curved lower surfaces 119 of the ratchet bars 116, permitting the ratchet bars to swing downwardly by gravity in a counterclockwise direction as viewed in FIGURE 7 about the axis of the ratchet bar support 110 whereby the ratchet teeth 118 are moved out of the path of the pawl 122.

The pawl is restrained from movement downwardly into engagement with the ratchet teeth by means of the embossments 160 formed on the lever sections 78 and 80 whereby the lever 60 is free to swing to brake released position under the influence of the retractile spring 54 shown in FIGURE 1 and the conventional brake shoe return springs (not shown). The lever 60 is thus moved to brake release position shown in FIGURES 1 and 6, the semi-hard rubber block or member 166 being engaged by the lever serves to cushion the shock of impact of the lever at brake release position.

As soon as the operator releases pressure upon the pad 148, the supplemental lever under the influence of the spring 152 is returned to its normal or full line position shown in FIGURE 6 which effects a reengagement of the edge region 150 of the web 132 with the lower surfaces of the ratchet bars 116 effecting pivotal movement of the ratchet bars in a clockwise direction as viewed in FIGURE 6 about their pivotal support 110 to move the ratchet teeth into a position as shown in FIGURE 6 whereby they are disposed so as to be engaged by the pawl 122 in subsequent movements of the lever 60 to brake-setting positions.

Thus the supplemental lever 130 serves as a keeper member to hold the ratchet bars 116 in pawl-engaging position and is movable to a position to disengage the ratchet teeth 118 from the pawl 122. It should be noted that the disposition of the ratchet bars 116 below the fulcrum of the lever 60 and intermediate the fulcrum and the foot pad 100 provides for the utilization of comparatively large teeth as the ratchet bars may be disposed a substantial distance from the lever fulcrum. It should be noted that all of the major components of the construction are fashioned of sheet metal enhancing the interchangeability of the components as well as providing a comparatively lightweight yet rigid and strong construction.

It is apparent that, within the scope of the invention, modifications and different arrangements may be made other than as herein disclosed. and the present disclosure is illustrative merely, the invention comprehending all variations thereof.

I claim:

1. Mechanism for controlling the parking brakes of a vehicle including, in combination, a support, a foot-operated main lever pivotally mounted intermediate its ends on the support, a ratchet bar mounted by said support for relative movement, a pawl mounted on said main lever arranged for cooperation with said ratchet bar for retaining the main lever in brake-setting positions, a supplemental lever pivotally mounted by the main lever for movement about an axis spaced from the pivotal axis of the main lever, said supplemental lever having a foot pad portion, resilient means engaging said supplemental lever normally biasing the supplemental lever into engagement with the ratchet bar for retaining the bar in the path of movement of the pawl, said supplemental lever being movable about its axis relative to the main lever to a position effecting disengagement of the ratchet bar from the pawl whereby said main lever is released for movement to brake release position.

2. Mechanism for controlling the parking brakes of a vehicle including, in combination, a support, a foot-operated main lever fulcrumed intermediate its ends on the support, said main lever having a foot pad portion at one end, a ratchet bar mounted by said support for relative pivotal movement and arranged between the fulcrum of the main lever and its foot pad portion, a pawl pivotally mounted on said main lever arranged for cooperation with said ratchet bar for retaining the main lever in brake-setting positions, a supplemental lever fulcrumed on said main lever at a region spaced from the fulcrum of the main lever and having a foot pad portion, said supplemental lever normally engaging the ratchet bar for retaining the bar in the path of movement of the pawl, resilient means biasing said supplemental lever to its normal position, said supplemental lever being movable relative to the main lever to a position effecting disengagement of the ratchet bar from the pawl whereby said main lever is released for movement to brake release position, and abutment means formed on the main lever for limiting pivotal movement of the pawl toward said ratchet bar.

3. Mechanism for controlling brakes of a vehicle including, in combination, a support, a foot-operated main lever fulcrumed intermediate its ends on the support, one arm of the main lever being adapted to be connected with the vehicle brake mechanism, the other arm of the lever having a foot pad portion, means for retaining the main lever in brake-setting positions including two cooperating clutch members, one of said members being pivotally mounted by the support and the other carried by the main lever, the clutch member carried by the main lever being disposed between the fulcrum thereof and the foot pad portion, an element pivotally mounted on the main lever on an axis spaced from the fulcrum of the main lever and engageable with the clutch member mounted on the support for normally retaining said member in the path of movement of the clutch member carried by the lever, said element being movable about its axis relative to the main lever to a position whereby said clutch members are in disengaged relation, a foot pad associated with said element, and resilient means in engagement with the main lever and said element normally biasing said element to a position maintaining said clutch members in engaging relation.

4. Mechanism for controlling brakes of a vehicle including, in combination, a support, a foot-operated main lever pivotally mounted intermediate its ends on the support, one arm of the main lever being adapted to be connected with the vehicle brake mechanism, the other arm of the lever having a foot pad portion, means for retaining the main lever in brake-setting positions including a ratchet bar mounted by said support for relative pivotal movement, a pawl pivotally mounted on said main lever arranged for cooperation with said ratchet bar, a supplemental lever fulcrumed on the main lever, said supplemental lever having a web portion and spaced side walls, said side walls adapted to straddle said main lever, a shaft extending through aligned openings in said main lever and the side walls providing the fulcrum for the supplemental lever at a region spaced from the pivotal axis of the main lever and spring means engaging the main and supplemental levers arranged to normally bias the supplemental lever toward a position wherein the web portion engages the ratchet bar to maintain the teeth of the ratchet bar in the path of movement of the pawl, the fulcrum of the supplemental lever being disposed whereby pivotal movement thereof in one direction effects disengagement of the teeth of the ratchet bar from the pawl to release said main lever for movement to brake release position.

5. Mechanism for controlling brakes of a vehicle including, in combination, a support, a foot-operated main lever fulcrumed intermediate its ends on the support, one arm of the main lever being adapted to be connected with the vehicle brake mechanism, the other arm of the lever having a foot pad portion, means for retaining the main lever in brake-setting positions including a ratchet bar mounted by said support for relative pivotal movement, a pawl pivotally mounted on said main lever arranged for cooperation with said ratchet bar, a supplemental lever formed of sheet metal fulcrumed on the main lever, said supplemental lever having a web portion and spaced side walls, said side walls adapted to straddle said main lever, a shaft extending through aligned openings in said main lever and the side walls providing the fulcrum for the supplemental lever at a region spaced from the fulcrum of the main lever, said web of the supplemental lever normally engaging the ratchet bar to maintain the teeth of the ratchet bar in the path of movement of the pawl, said supplemental lever having a laterally offset portion provided with a foot pad portion disposed at the side of the foot pad portion on the main lever, means normally biasing said supplemental lever to a position maintaining the ratchet bar in engagement with the pawl, the fulcrum of the supplemental lever being disposed whereby pivotal movement thereof in one direction effects disengagement of the teeth of the ratchet bar from the pawl to release said main lever for movement to brake release position, and means on said main lever for limiting pivotal movement of the pawl toward the ratchet bar.

6. Mechanism for controlling brakes of a vehicle including, in combination, a support, a foot-operated main lever fulcrumed intermediate its ends on the support, one arm of the main lever being adapted to be connected with the vehicle brake mechanism, the other arm of the lever having a foot pad portion, means for retaining the main lever in brake-setting positions including a ratchet bar mounted by said support for relative pivotal movement, a pawl pivotally mounted on said main lever arranged for cooperation with said ratchet bar, a supplemental lever formed of sheet metal fulcrumed on the main lever, said supplemental lever having a web portion and spaced side walls, said side walls adapted to straddle said main lever, a shaft extending through aligned openings in said main lever and the side walls providing the fulcrum for the supplemental lever at a region spaced from the fulcrum of the main lever, said web of the supplemental lever normally engaging the ratchet bar to maintain the teeth of the ratchet bar in the path of movement of the pawl, said supplemental lever having a laterally offset portion provided with a foot pad portion disposed at the side of the foot pad portion on the main lever, spring means engaging said main and supplemental levers normally biasing said supplemental lever to a position maintaining the ratchet bar in engagement with the pawl, the fulcrum of the supplemental lever being disposed whereby pivotal movement thereof in one direction effects disengagement of the teeth of the ratchet bar from the pawl to release said main lever for movement to brake release position, and an embossment formed on said main lever for limiting pivotal movement of the pawl toward the ratchet bar.

References Cited in the file of this patent

UNITED STATES PATENTS

| | | |
|---|---|---|
| 738,100 | Cuntz | Sept. 1, 1903 |
| 1,323,661 | Urton | Dec. 2, 1919 |
| 1,532,868 | Blackburn | Apr. 7, 1925 |
| 1,608,382 | Fox | Nov. 23, 1926 |
| 2,141,778 | Wenn | Dec. 27, 1938 |
| 2,183,772 | Johnson | Dec. 19, 1939 |
| 2,908,185 | Koskela | Oct. 13, 1959 |
| 2,915,916 | Hinsey et al. | Dec. 8, 1959 |
| 2,977,818 | Strozik | Apr. 4, 1961 |
| 2,978,926 | Hinsey | Apr. 11, 1961 |
| 3,003,364 | Hinsey | Oct. 10, 1961 |

FOREIGN PATENTS

| | | |
|---|---|---|
| 867,358 | Germany | Feb. 16, 1953 |